(12) United States Patent
Kerscher et al.

(10) Patent No.: US 11,465,192 B2
(45) Date of Patent: Oct. 11, 2022

(54) TOOL CARTRIDGE

(71) Applicant: TRUMPF Schweiz AG, Gruesch (CH)

(72) Inventors: Stefan Kerscher, Walzbachtal (DE); Etienne Lardon, Huenenberg See (CH); Dario Nussbaum, Unteraegeri (CH); Mathias Tweitmann, Waedenswil (CH)

(73) Assignee: TRUMPF Schweiz AG, Gruesch (CH)

( * ) Notice: Subject to any disclaimer, the term of this patent is extended or adjusted under 35 U.S.C. 154(b) by 553 days.

(21) Appl. No.: 16/524,237

(22) Filed: Jul. 29, 2019

(65) Prior Publication Data

US 2019/0344324 A1  Nov. 14, 2019

Related U.S. Application Data

(63) Continuation of application No. PCT/EP2018/052638, filed on Feb. 2, 2018.

(30) Foreign Application Priority Data

Feb. 3, 2017 (DE) .......................... 102017201787.2

(51) Int. Cl.
 *B21D 37/14* (2006.01)
 *B23Q 3/155* (2006.01)
 *B25H 3/04* (2006.01)

(52) U.S. Cl.
 CPC ............. *B21D 37/14* (2013.01); *B23Q 3/155* (2013.01); *B23Q 3/15506* (2013.01);
 (Continued)

(58) Field of Classification Search
 CPC .......... B23Q 3/155; B23Q 2003/15527; B23Q 2003/15532; B23Q 3/15533; B23Q 3/15506; B23Q 3/15526; Y10T 483/1729; Y10T 483/1731; Y10T 403/7005; Y10T 403/7015; Y10T 403/7096; B21D 37/04; B21D 37/14; B25H 3/04
 (Continued)

(56) References Cited

U.S. PATENT DOCUMENTS

| 431,641 | A | * | 7/1890 | Beach | ..................... B25B 13/48 |
| | | | | | 269/274 |
| 2,606,583 | A | * | 8/1952 | O'Connor | ............... B25B 5/003 |
| | | | | | 269/95 |

(Continued)

FOREIGN PATENT DOCUMENTS

| CN | 102806269 A | 12/2012 | |
| CN | 205799447 U | 12/2016 | |
| EP | 2 529 854 | 12/2012 | ............. B21D 37/04 |

OTHER PUBLICATIONS

International Search Report and Written Opinion for International Application No. PCT/EP2018/052638 dated May 17, 2018.

*Primary Examiner* — Jennifer E. Novosad
(74) *Attorney, Agent, or Firm* — Fish & Richardson P.C.

(57) ABSTRACT

A tool cartridge for accommodating a processing tool includes: a cartridge base body, a tool holder for detachably holding the processing tool, and at least one first coupling device configured to be coupled in a form-fit and detachable manner to a second coupling device of a further tool cartridge, the second coupling device being complementary to the first coupling device.

17 Claims, 3 Drawing Sheets

(52) U.S. Cl.
CPC ........... *B23Q 3/15526* (2013.01); *B25H 3/04* (2013.01); *B23Q 2003/15527* (2016.11); *B23Q 2003/15532* (2016.11)

(58) Field of Classification Search
USPC ...... 211/70.6; 483/28, 29; 403/348, 353, 382
See application file for complete search history.

(56) References Cited

U.S. PATENT DOCUMENTS

| | | | | |
|---|---|---|---|---|
| 2,778,393 | A * | 1/1957 | Golasowski | B25B 5/003 269/97 |
| 3,822,019 | A * | 7/1974 | Baatz | B25B 13/56 210/469 |
| 4,084,300 | A * | 4/1978 | Narushima | B23Q 3/15706 408/35 |
| 4,141,542 | A * | 2/1979 | Wolff | B25B 5/101 269/155 |
| 4,359,163 | A * | 11/1982 | Ratti | B23Q 3/15553 211/70.6 |
| 4,410,095 | A * | 10/1983 | Dembicks | A47F 5/08 248/225.11 |
| 4,535,897 | A * | 8/1985 | Remington | B25H 3/00 211/74 |
| 4,828,241 | A * | 5/1989 | Yang | B25B 5/166 269/45 |
| 5,221,132 | A * | 6/1993 | Combs | B25H 3/04 211/DIG. 1 |
| 5,258,166 | A * | 11/1993 | Janzer | B25H 3/023 422/294 |
| 5,373,606 | A * | 12/1994 | Bosyj | B60B 33/0023 211/70.6 |
| 5,564,806 | A * | 10/1996 | Keisling | A47B 47/0033 403/231 |
| 5,588,659 | A * | 12/1996 | Boes | B25H 3/04 280/47.35 |
| 5,672,145 | A * | 9/1997 | Pollington | B23Q 3/15706 483/65 |
| 5,704,496 | A * | 1/1998 | Latta | B62B 1/262 211/70.6 |
| 5,881,891 | A * | 3/1999 | Murphy, Jr. | A47L 13/51 211/70.6 |
| 5,913,761 | A * | 6/1999 | Kamada | B21D 28/265 83/563 |
| 6,095,329 | A * | 8/2000 | Kao | B65D 85/20 206/378 |
| 6,571,966 | B1 * | 6/2003 | Hsiao | A47F 7/0028 206/379 |
| 6,681,940 | B1 * | 1/2004 | Cash | B25H 3/04 211/70.6 |
| 7,036,668 | B2 * | 5/2006 | Udy | B25H 3/04 211/60.1 |
| 7,159,712 | B1 | 1/2007 | Chen | |
| 7,188,726 | B2 * | 3/2007 | Lin | B25H 3/003 206/743 |
| 7,424,958 | B1 * | 9/2008 | Eley | A47F 5/0815 211/70.6 |
| 7,669,453 | B2 * | 3/2010 | Palick | B23Q 3/15553 72/446 |
| 7,802,680 | B2 * | 9/2010 | Krebs | B25H 3/04 206/349 |
| 7,913,533 | B2 * | 3/2011 | Lee | B23Q 3/15546 72/446 |
| 7,922,013 | B2 * | 4/2011 | Nguy | B25H 3/025 211/196 |
| 8,083,059 | B1 * | 12/2011 | Wessel, IV | B25H 3/003 206/378 |
| 8,261,911 | B2 * | 9/2012 | Lee | B25H 3/04 206/372 |
| 8,511,485 | B2 * | 8/2013 | Hernandez | A47F 5/0838 211/106.01 |
| 8,535,208 | B2 * | 9/2013 | Jordil | G01B 7/012 483/59 |
| 9,302,308 | B2 * | 4/2016 | Schindewolf | B21D 45/006 |
| 9,782,818 | B2 * | 10/2017 | Broadbent | B21D 37/14 |
| 10,694,732 | B2 * | 6/2020 | Kalajzich | A45C 11/00 |
| 11,045,859 | B2 * | 6/2021 | Tweitmann | B21D 37/14 |
| 2003/0130101 | A1 * | 7/2003 | Hwang | B23Q 3/15553 211/1.53 |
| 2006/0151406 | A1 * | 7/2006 | Hsien-Chung | A47F 5/0838 211/70.6 |
| 2007/0068887 | A1 * | 3/2007 | Nawrocki | A47F 5/0807 211/171 |
| 2007/0191199 | A1 * | 8/2007 | Palick | B21D 28/34 483/28 |
| 2009/0166305 | A1 * | 7/2009 | Hsieh | A47F 7/0028 211/70.6 |
| 2010/0065519 | A1 * | 3/2010 | Nguy | B25H 3/04 211/70.6 |
| 2011/0114580 | A1 * | 5/2011 | Chen | B25H 3/04 211/70.6 |
| 2012/0085714 | A1 * | 4/2012 | Johnson | A47L 13/51 211/85.17 |
| 2012/0309600 | A1 * | 12/2012 | Schindewolf | B21D 37/04 483/59 |
| 2012/0312067 | A1 * | 12/2012 | Broadbent | B21D 28/34 72/462 |
| 2013/0068709 | A1 * | 3/2013 | Liu | B25H 3/04 211/70.6 |
| 2019/0344323 | A1 * | 11/2019 | Tweitmann | B23Q 3/15553 |

* cited by examiner

TOOL CARTRIDGE

CROSS REFERENCE TO RELATED APPLICATIONS

This application is a continuation of and claims priority under 35 U.S.C. § 120 from PCT Application No. PCT/EP2018/052638 filed on Feb. 2, 2018, which claims priority from German Application No. DE 10 2017 201 787.2, filed on Feb. 3, 2017. The entire contents of each of these priority applications are incorporated herein by reference.

TECHNICAL FIELD

The invention relates generally to a tool cartridge, and in particular to a tool cartridge for detachably holding a processing tool for a processing machine for sheet metals.

BACKGROUND

Usually, tool cartridges for processing tools have a carrying handle which enables an ergonomical carrying of a tool cartridge. The handle is designed such that, by one hand, only one tool cartridge can be carried. However, for setting a processing machine, it is advantageous if several tool cartridges can be carried simultaneously to the machine to insert them into a tool magazine of the processing machine. Due to this reason, several tool cartridges are often carried by their handles by respective individual fingers, whereby, due to the weight of the processing tools, a load to the individual fingers is very high. This is inconvenient for the operator of the machine and bears an injury risk.

SUMMARY

One of the objects of the invention is to solve the above problems and to provide a tool cartridge which enables carrying several tool cartridges simultaneously.

According to an aspect of the invention, a tool cartridge comprising a first coupling device adapted such that it can be coupled to a second coupling device of a further tool cartridge in a form-fit and detachable manner, wherein the second coupling device is complementary to the first coupling device, is provided.

By the provision of the first coupling device on a first tool cartridge, wherein the first coupling device can be coupled to a second coupling device complementary to the first coupling device, a further tool cartridge can be coupled to the first cartridge and, thus, the first as well as the further tool cartridge can be carried by means of the first tool cartridge.

When the first coupling device is advantageously configured hook-shaped and the second coupling device is configured as a hook receiver, the first tool cartridge and the further tool cartridge can be coupled with one another very easily.

By an advantageous implementation of the hook receiver as an orifice in a surface of the further tool cartridge, wherein the orifice comprises an undercut for the hook-shaped configured first coupling device, a counterpart of the hook-shaped coupling device can be formed easily without occupying additional installation space.

When the first coupling is advantageously provided with a contact surface to which the surface of the further tool cartridge abuts and support against, the first and the further tool cartridges have a stable connection which cannot simply be unhooked in an unintended manner.

Upon an advantageous provision of the tool cartridge having a handle, the first as well as the further tool cartridge or the further tool cartridges can be carried ergonomically.

By a provision of a cartridge base body of the tool cartridge out of plastic, the first as well as the second coupling device can be simply integrated in the base body and, furthermore, a use of plastic provides a cartridge base body having low weight.

Advantageously, the tool cartridges are provided with the first as well as with the second coupling device so that the tool cartridges can be coupled in an arbitrary manner.

By a lateral arrangement of one of the coupling device with respect to a front side having a tool holder and an opposite rear side and by an arrangement of the other one of the coupling devices on the rear side, the first and the further tool cartridges can be coupled in a compact manner without a collision of the held processing tools.

Insofar as one of the coupling devices is laterally arranged on both sides, it, except from coupling only the first and the further tool cartridges, is possible to couple several tool cartridges to one another.

By a provision of a set of tool cartridges, in particular, a set of identical tool cartridges, the odds are that a flexible interchange concept for processing tools can be realized since also several different processing tools can be brought to the machine easily.

DESCRIPTION OF DRAWINGS

Now, the invention is elucidated by means of an embodiment referring to the attached drawings.

In particular.

DETAILED DESCRIPTION

Figure 1:
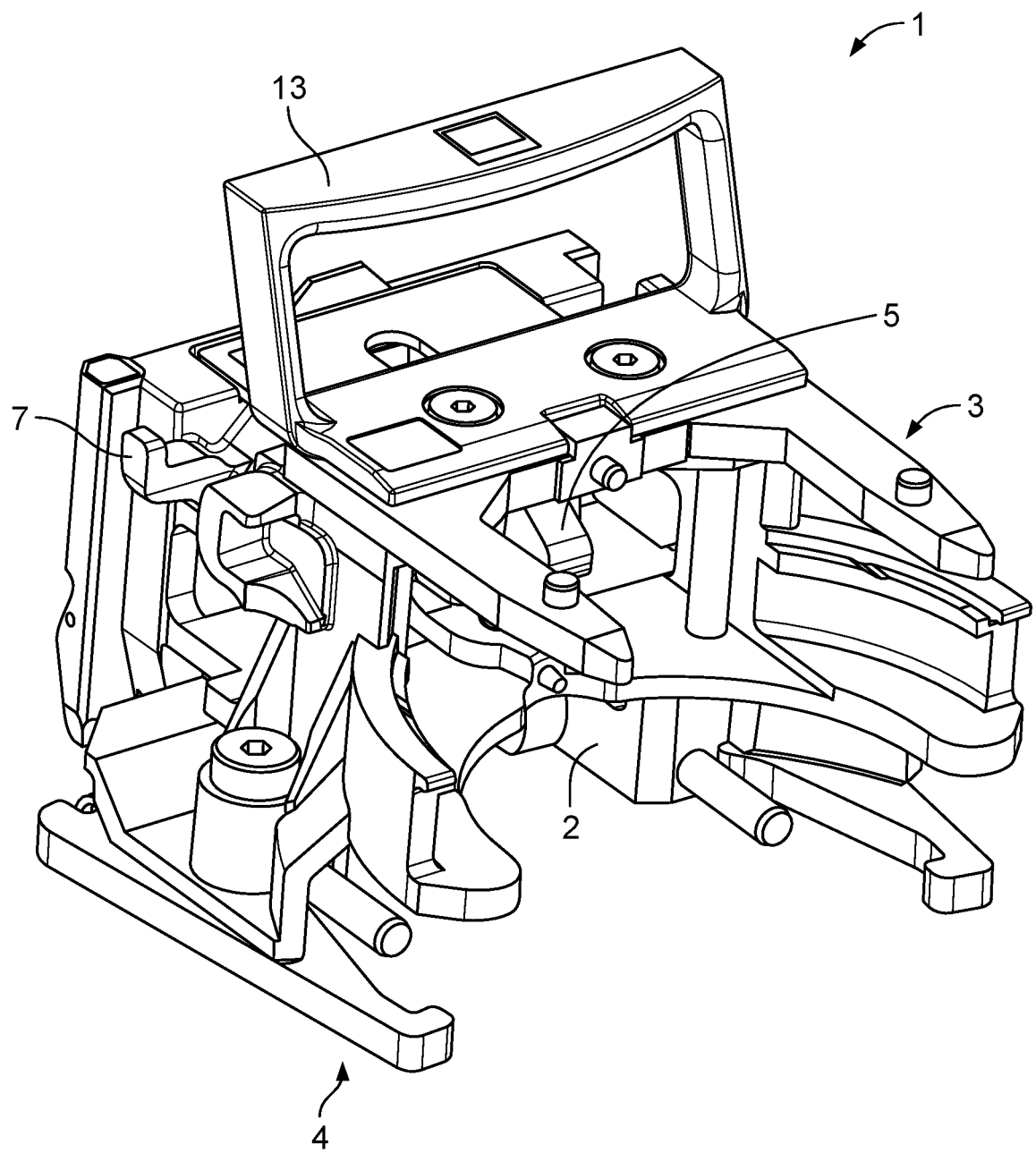
FIG. 1 shows a perspective view of a tool cartridge obliquely from the front.
Figure 2:
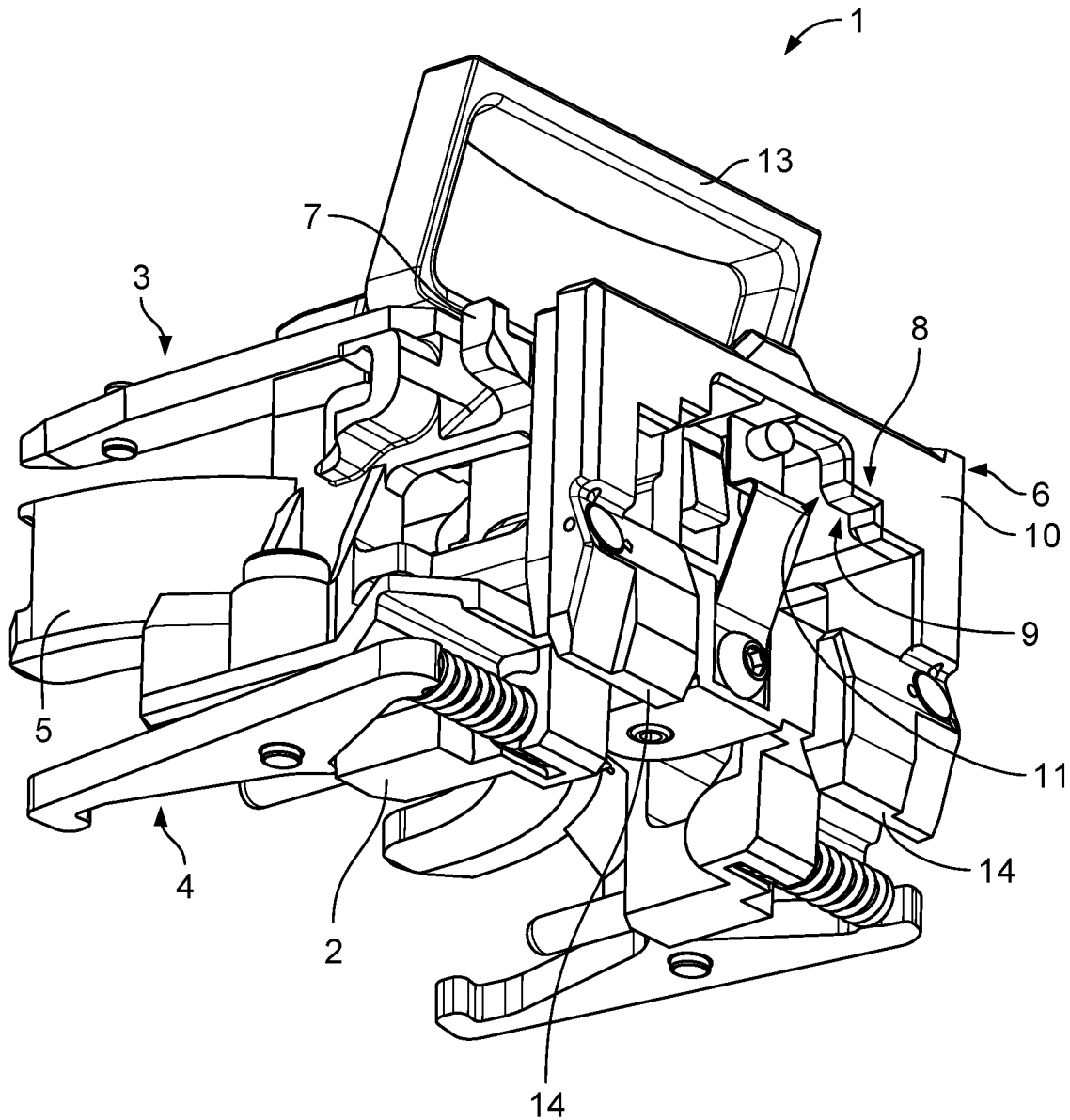
FIG. 2 shows a perspective view of the tool cartridge obliquely from the rear.

FIG. 1 shows a perspective view of a tool cartridge 1 obliquely from the front and FIG. 2 shows a perspective view of the tool cartridge 1 obliquely from the rear.

The tool cartridge 1 serves for accommodating a processing tool (not shown). The tool cartridge 1 comprises a cartridge base body 2. The cartridge base body 2 is made of plastic, for example, a fiber-reinforced polyamide. Alternatively, the cartridge base body can be made of another material, in particular, of aluminum or a magnesium alloy. The cartridge base body can alternatively also be made only partially of plastic or only partially of aluminum or the magnesium alloy.

On the cartridge base body 2, a tool holder for detachably holding the processing tool suitable for processing plate-shaped workpieces is provided. The tool holder includes a stamp holder 3 for detachably holding a tool portion of the processing tool configured as a processing stamp and a die holder 4 for detachably holding a tool part of the processing tool configured as a processing die. Further, an optional holder 5 for a stripper of the processing tool is provided at the front side.

On a rear side of the tool cartridge 1, which is a side opposite to the front side, a fixing device (or a fixer) 6 (FIG.

2) for fixing the tool cartridge 1 in a tool magazine of a processing machine (not shown) is provided.

The tool cartridge 1 is further provided with a first coupling device (or coupler) 7 configured to be hook-shaped. The first coupling device 7 does not mandatorily have to be hook-shaped but it can alternatively be configured as another force-fit or form-fit connection.

In this embodiment, a second coupling device (or coupler) 8 (FIG. 2) is also provided on the tool cartridge 1. The second coupling device 8 is configured to be complementary to the first coupling device 7 and, in this embodiment, it is configured as a hook receiver. The first coupling device 7 and the second coupling device 8 can be coupled in a form-fit and detachable manner.

In this embodiment, the first coupling device 7 as well as the second coupling device 8 are provided on the tool cartridge 1. Alternatively, one of the tool cartridges 1 can electively comprise only the first coupling device 7 or only the second coupling device 8 and the other one of the coupling devices is provided on a further tool cartridge 1'.

Figure 3:
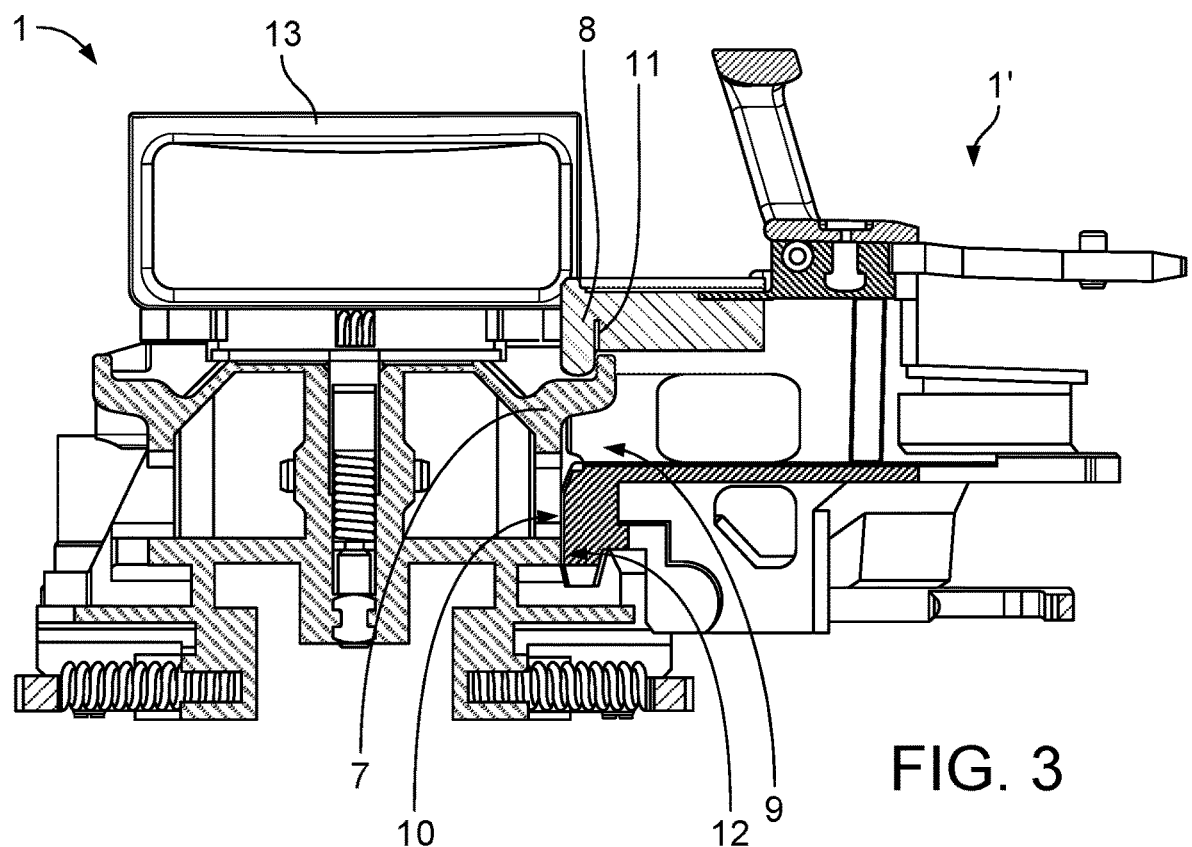
FIG. 3 shows a sectional view of tool cartridges coupled to one another.

FIG. 3 is a sectional view of tool cartridges coupled to one another, namely, the tool cartridge 1 and the further tool cartridge 1'.

As to be seen in FIG. 2 and FIG. 3, the second coupling device 8 comprises an orifice 9 in a surface 10 of the tool cartridge 1 and the orifice 9 comprises an undercut 11. In the undercut 11, the hook-shaped first coupling device 7 engages in order to couple the tool cartridge 1 and the further tool cartridge 1'.

The first coupling device 7 is further provided with a contact surface 12. The contact surface 12 is configured such that, in a hooked-in state, the second coupling device 8 abuts to the contact surface 12 by the surface 10 of the further tool cartridge 1' and supports oneself against the contact surface 12. Moreover, further contact faces 14 are arranged on the cartridge base body 2 in an angle of 90 degrees with respect to the contact faces 12 such that, in a state in which the further tool cartridge 1' is hooked into the tool cartridge 1, the further tool cartridge 1' is additionally supported by these contact faces 14. In this manner, the two tool cartridges (1, 1') are immovably coupled to one another and each of the tool cartridges (1, 1') takes a defined position with respect to a respective other tool cartridge (1, 1'). Alternatively, a various number of contact faces 14 can be provided.

As to be seen in the figures, the tool cartridge 1 optionally comprises a handle 13. The handle 13 serves for carrying the tool cartridge 1 and the further tool cartridges 1' coupled to the tool cartridge 1 as the case may be.

Figure 4:
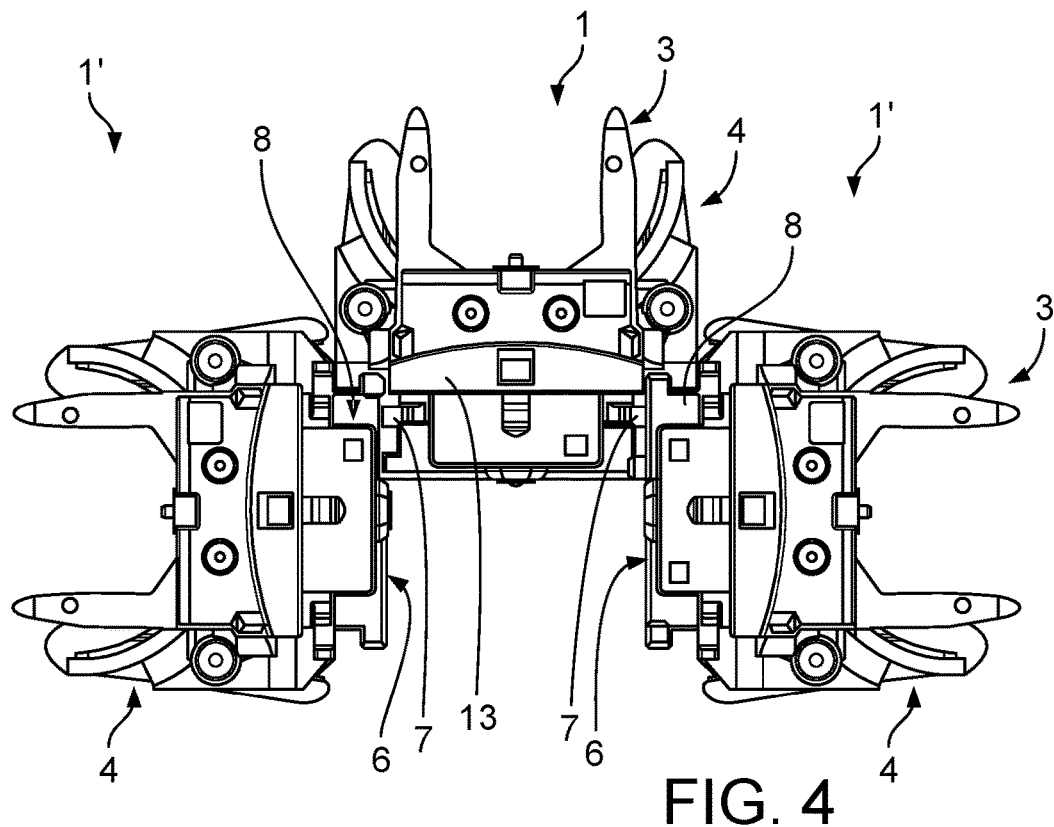
FIG. 4 shows a plan view of three tool cartridges coupled to one another.

FIG. 4 shows a plan view onto three tool cartridges coupled to one another, namely the tool cartridge 1 and the further tool cartridges 1'. Also in this figure, the faces of the tool cartridges 1, 1' on which the tool holders in the form of the stamp holder 3 and the die holder 4 are arranged are defined as the front side and the opposite side on which the fixing devices 6 for fixing the tool cartridges 1, 1' in the tool magazine are respectively arranged is defined as the rear side. Faces located horizontally between the front side and the rear side are defined as being lateral. Therefore, as shown in FIG. 4, on the side of the tool cartridge 1, the first coupling devices 7 are arranged on both sides. Alternatively, the first coupling device 7 can also be arranged only on one side of the tool cartridge 1. The second coupling device 8 is shown as being arranged on the rear side of the further tool cartridges 1'.

The tool cartridge 1 and the further tool cartridges 1' form a set of several tool cartridges 1, 1'. The tool cartridges 1, 1' shown here respectively comprise an identical arrangement of the first coupling devices 7 and the second coupling devices 8. Alternatively, the arrangement or the provision of the coupling devices 7, 8 can be different.

All features disclosed in the description, the subsequent claims and the drawing can solitary or together in an arbitrary combination be essential for the invention.

What is claimed is:

1. A tool cartridge for accommodating a processing tool, the tool cartridge comprising:
   a cartridge base body;
   a tool holder arranged on the cartridge base body and configured to detachably hold the processing tool;
   at least one first coupler configured to be coupled in a form-fit and detachable manner to a second coupler of a further tool cartridge, the second coupler being complementary to the first coupler;
   a first face on which the tool holder is arranged and being defined as a first front side that corresponds to a second front side of the further tool cartridge;
   a second face opposite to the first front side and being defined as a first rear side that corresponds to a second rear side of the further tool cartridge; and
   first lateral faces being horizontally between the first front side and the first rear side and corresponding to second lateral faces horizontally between the second front side and the second rear side of the further tool cartridge,
   wherein the first coupler is arranged on one of the first lateral faces, and the second coupler is arranged on the second rear side of the further tool cartridge.

2. The tool cartridge of claim 1, wherein the first coupler is hook-shaped, and wherein the second coupler is configured as a hook receiver.

3. The tool cartridge of claim 2, wherein the first coupler is configured to engage with the second coupler via an undercut of orifice in a surface of the further tool cartridge.

4. The tool cartridge of claim 3, wherein the first coupler is provided with a contact surface configured such that, in a hooked-in state, the surface of the further tool cartridge abuts to the contact surface and supports the further tool cartridge against the contact surface.

5. The tool cartridge of claim 4, wherein the cartridge base body is provided with at least one further contact surface arranged such that, in the hooked-in state, a cartridge base body of the further tool cartridge abuts to the at least one further contact surface and supports the further tool cartridge against the at least one further contact surface.

6. The tool cartridge of claim 1, wherein the tool cartridge comprises a handle configured to carry the tool cartridge.

7. The tool cartridge of claim 1, wherein the cartridge base body is made of plastic.

8. The tool cartridge of claim 1, further comprising:
   at least one second coupler that is substantially same as the second coupler of the further tool cartridge.

9. The tool cartridge of claim 1, comprising two first couplers each arranged on a respective one of the first lateral faces.

10. The tool cartridge of claim 1, wherein the tool holder comprises:
    a stamp holder configured to detachably hold a first tool portion of the processing tool that is configured as a processing stamp; and
    a die holder configured to detachably hold a second tool portion of the processing tool that is configured as a processing die.

11. The tool cartridge of claim 1, wherein the tool holder comprises:

a stripper holder configured to hold a stripper of the processing tool.

12. The tool cartridge of claim 1, further comprising:
a fixer configured to fix the tool cartridge in a tool magazine of a processing machine.

13. The tool cartridge of claim 12, wherein the tool holder and the fixer are arranged on opposite sides of the tool cartridge.

14. A tool cartridge system comprising:
multiple tool cartridges each configured to accommodate a respective processing tool, the multiple tool cartridges including:
a first tool cartridge comprising:
a cartridge base body;
a tool holder arranged on the cartridge base body and configured to detachably hold a first processing tool;
at least one first coupler;
a first face on which the tool holder is arranged and being defined as a first front side;
a second face opposite to the first front side and being defined as a first rear side; and
first lateral faces being horizontally between the first front side and the first rear side; and
a second tool cartridge comprising:
a second coupler;
a second front side corresponding to the first front side of the first tool cartridge;
a second rear side corresponding to the first rear side of the first tool cartridge;
second lateral faces being horizontally between the second front side and the second rear side,
wherein the first coupler of the first tool cartridge is configured to be coupled in a form-fit and detachable manner to the second coupler of the second tool cartridge, the second coupler being complementary to the first coupler, and
wherein the first coupler is arranged on one of the first lateral faces of the first tool cartridge, and the second coupler is arranged on the second rear side of the second tool cartridge.

15. The tool cartridge system of claim 14, wherein the first and second tool cartridges comprise an identical arrangement of the first coupler and the second coupler.

16. The tool cartridge system of claim 14, further comprising a third tool cartridge comprising a third coupler,
wherein the first tool cartridge comprises two first couplers each arranged on a respective one of the first lateral faces, and
wherein one of the two first couplers is configured to be coupled in form-fit and detachably to the second coupler of the second tool cartridge, and the other one of the two first couplers is configured to be coupled in form-fit and detachably to the third coupler of the third tool cartridge, the third coupler being complementary to the other one of the two first couplers.

17. The tool cartridge system of claim 14,
wherein the first tool cartridge comprises a second coupler on the first rear side, the second coupler of the first tool cartridge being substantially the same as the second coupler of the second tool cartridge.

* * * * *